US009151985B2

(12) United States Patent
Yamamoto et al.

(10) Patent No.: US 9,151,985 B2
(45) Date of Patent: *Oct. 6, 2015

(54) LIQUID CRYSTAL DISPLAY DEVICE

(71) Applicant: JAPAN DISPLAY INC., Minato-ku (JP)

(72) Inventors: Koji Yamamoto, Saitama-ken (JP); Jin Hirosawa, Saitama-ken (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,630

(22) Filed: Oct. 8, 2014

(65) Prior Publication Data
US 2015/0055045 A1 Feb. 26, 2015

Related U.S. Application Data

(62) Division of application No. 13/425,862, filed on Mar. 21, 2012, now Pat. No. 8,873,008.

(30) Foreign Application Priority Data

Mar. 31, 2011 (JP) ................................. 2011-078553

(51) Int. Cl.
*G02F 1/1343* (2006.01)
*G02F 1/1337* (2006.01)
(Continued)

(52) U.S. Cl.
CPC ............ *G02F 1/1337* (2013.01); *G02F 1/1368* (2013.01); *G02F 1/133345* (2013.01);
(Continued)

(58) Field of Classification Search
CPC .................................................. G02F 1/134363
USPC ........................................................ 349/141
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |

(Continued)

FOREIGN PATENT DOCUMENTS

| JP | 6-222397 | 8/1994 |
| JP | 7-159807 | 6/1995 |

(Continued)

OTHER PUBLICATIONS

English translation of Office Action issued Apr. 16, 2013 in Japanese Patent Application No. 2011-078553.

*Primary Examiner* — Thanh-Nhan P Nguyen
(74) *Attorney, Agent, or Firm* — Oblon, McClelland, Maier & Neustadt, L.L.P.

(57) ABSTRACT

In one embodiment, a liquid crystal display device includes a first substrate and a second substrate. The first substrate includes a first source line and a second source line extending in a first direction, a main pixel electrode arranged between the first source line and a second source line and extending in the first direction, and a pair of first main common electrodes arranged on the first source line and the second source line interposing an insulating layer and extending in the first direction, respectively. The second substrate includes a pair of second main common electrode arranged above the first main common electrode and extending in the first direction, and the first main common electrode is connected with the second main common electrode. A liquid crystal layer is held between the first substrate and the second substrate.

6 Claims, 5 Drawing Sheets

(51) Int. Cl.
  *G02F 1/1333* (2006.01)
  *G02F 1/1362* (2006.01)
  *G02F 1/1368* (2006.01)

(52) U.S. Cl.
  CPC .... *G02F1/134309* (2013.01); *G02F 1/136286* (2013.01); *G02F 1/134363* (2013.01); *G02F 2001/134381* (2013.01)

(56) References Cited

U.S. PATENT DOCUMENTS

| | | | |
|---|---|---|---|
| 2004/0125303 A1* | 7/2004 | Chung | 349/141 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2005/0231675 A1* | 10/2005 | Chen et al. | 349/141 |
| 2007/0115234 A1 | 5/2007 | Kim et al. | |
| 2007/0273819 A1* | 11/2007 | Kawasaki et al. | 349/141 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2003-287770 A | 10/2003 |
| JP | 2005-3802 | 1/2005 |
| JP | 3644653 | 2/2005 |
| JP | 2005-242307 | 9/2005 |
| JP | 2009-109657 A | 5/2009 |
| JP | 2009-128905 A | 6/2009 |

\* cited by examiner

CROSS TALK RATE = |W(n)−G(n)|/G(n) × 100

※ n=1~4

LIQUID CRYSTAL DISPLAY DEVICE

CROSS-REFERENCE TO RELATED APPLICATION

This application is a divisional of U.S. application Ser. No. 13/425,862 filed Mar. 21, 2012, and is based upon and claims the benefit of priority from prior Japanese Patent Application No. 2011-078553, filed Mar. 31, 2011, the entire contents of each of which are incorporated herein by reference.

FIELD

Embodiments described herein relate generally to a liquid crystal display device.

BACKGROUND

In recent years, a flat panel display device is developed briskly, and especially the liquid crystal display device gets a lot of attention from advantages, such as light weight, thin shape, and low power consumption. Especially, in an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and common electrodes formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
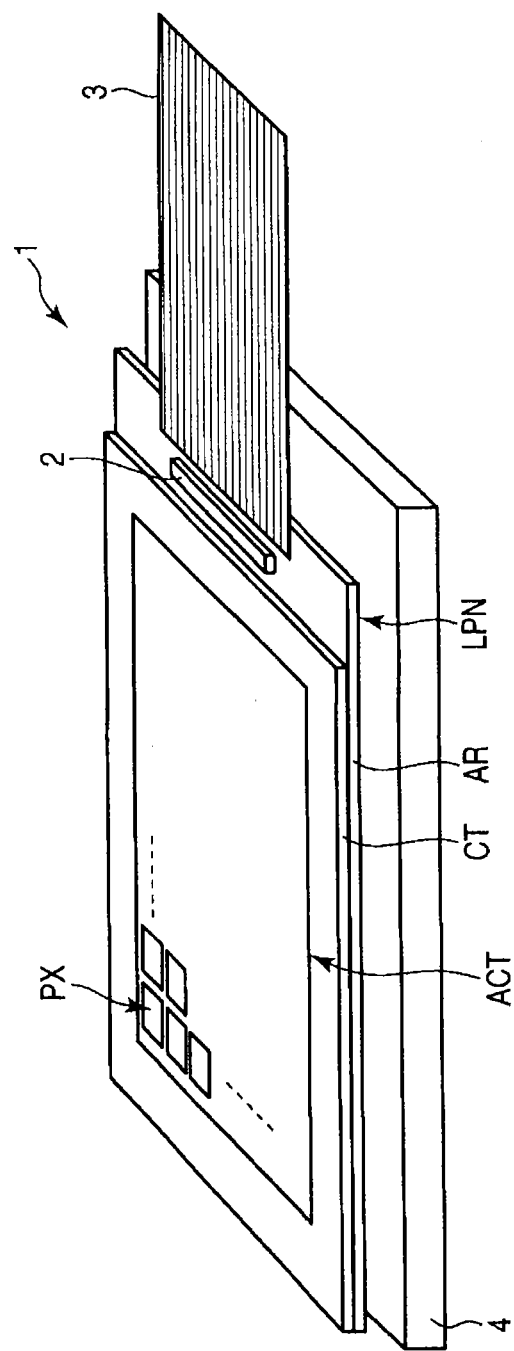
FIG. 1 is a figure schematically showing a structure of a liquid crystal display device according to this embodiment.

A liquid crystal display device according to an exemplary embodiment of the present invention will now be described with reference to the accompanying drawings wherein the same or like reference numerals designate the same or corresponding portions throughout the several views.

According to one embodiment a liquid crystal display device, includes: a first substrate including a first source line and a second source line extending in a first direction, a main pixel electrode arranged between the first source line and the second source line and extending in the first direction, and a pair of first main common electrodes arranged on the first source line and the second source line interposing an insulating layer and extending in the first direction, respectively; a second substrate including a pair of second main common electrodes arranged above the first main common electrode and extending in the first direction, the first main common electrode being connected with the second main common electrode; and a liquid crystal layer held between the first substrate and the second substrate.

FIG. 1 is a figure schematically showing the structure of the liquid crystal display device according to one embodiment.

The liquid crystal display device 1 includes an active-matrix type liquid crystal display panel LPN, a driver IC chip 2 connected to the liquid crystal display panel LPN, a flexible wiring substrate 3, a backlight 4 for illuminating the liquid crystal display panel LPN, etc.

The liquid crystal display panel LPN is equipped with an array substrate AR as a first substrate, a counter substrates CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

The backlight 4 is arranged on the back side of the array substrate AR in the illustrated example. Various types of backlights can be used as the backlight 4. For example, a light emitting diode (LED) or a cold cathode fluorescent lamp (CCFL), etc., can be applied as a light source of the backlight 4, and the explanation about its detailed structure is omitted.

Figure 2:
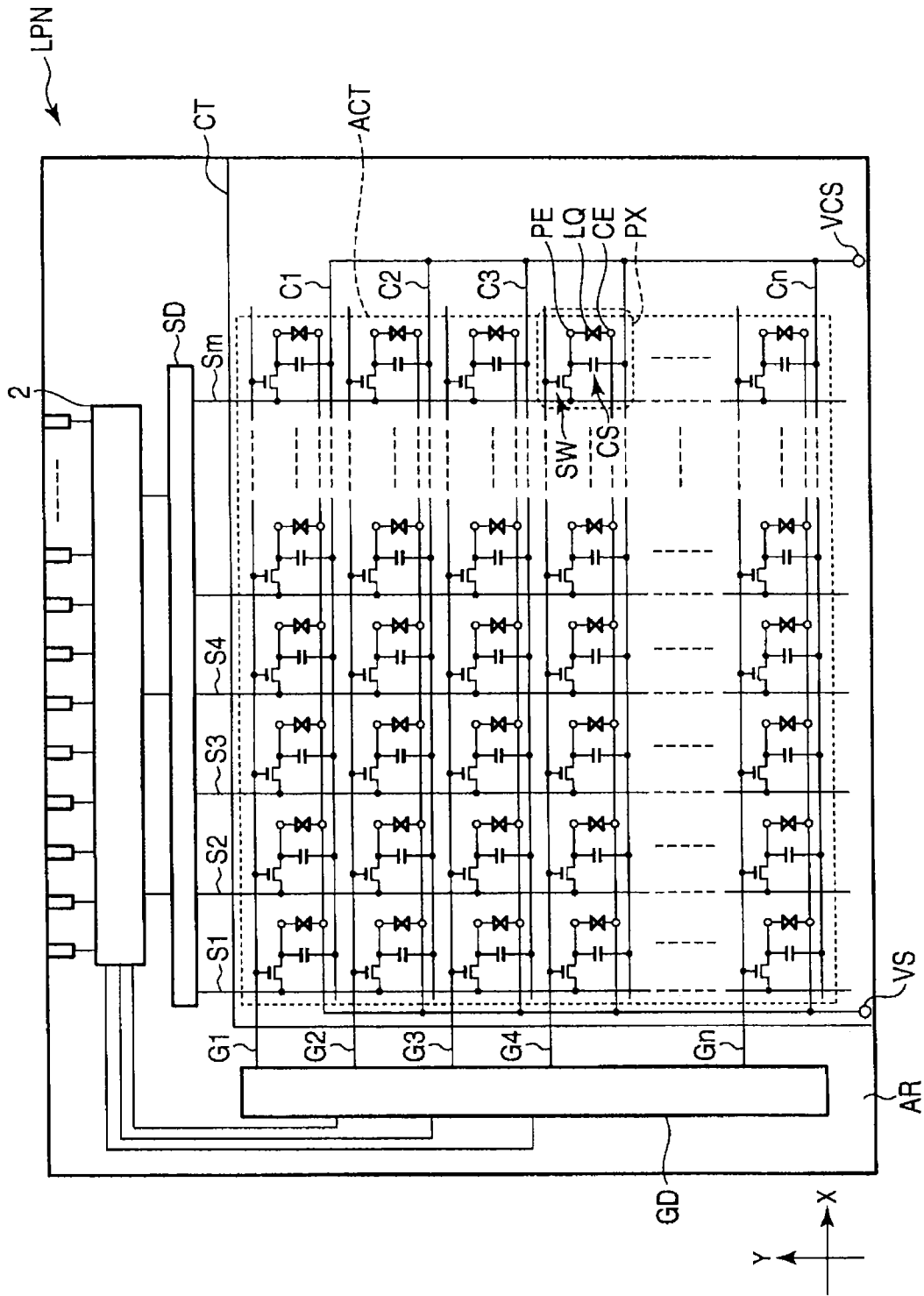
FIG. 2 is a figure schematically showing the structure and the equivalent circuit of a liquid crystal display panel shown in FIG. 1.

FIG. 2 is a figure schematically showing the structure and the equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C are respectively arranged along a first direction Y by turns. Moreover, the gate line G and the auxiliary capacitance line C extend in parallel each other in a second direction X that intersects perpendicularly the first direction Y. However they do not necessarily extend linearly. The source lines S extend in the first direction Y that intersects the gate line G and the auxiliary capacitance line C in parallel. Though the source lines S extend in the first direction Y, respectively, they do not necessarily extend linearly. The gate line G, the auxiliary capacitance line C and source lines S may be crooked partially.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example between the auxiliary capacitance line C and the pixel electrode PE.

In addition, in the liquid crystal display panel LPN according to this embodiment, while the pixel electrode PE is formed in the array substrate AR, the common electrode CE is formed in the array substrate AR and the counter substrate CT. The liquid crystal molecule of a liquid crystal layer LQ is switched mainly using an electric field formed between the pixel electrodes PE and the common electrodes CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surface of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The common electrode CE is set to a common potential, for example. The common electrode CE is arranged in common to the plurality of pixel electrodes PE through the liquid crystal layer LQ. The common electrode CE is electrically connected with an electric power supply portion VS formed in the array substrate AR through an electric conductive component which is not illustrated. The auxiliary capacitance line C is electrically connected with a voltage impressing portion VCS to which the auxiliary capacitance voltage is impressed.

The array substrate AR includes an electric power supply portion VS formed outside of the active area ACT. A portion of the common electrode CE formed on the array substrate AR is connected with the electric power supply portion VS at the outside of the active area ACT. Furthermore, a portion of the common electrode CE formed on the counter substrate CT is electrically connected with the electric power supply portion VS formed in the array substrate AR through an electric conductive component which is not illustrated.

Figure 3:
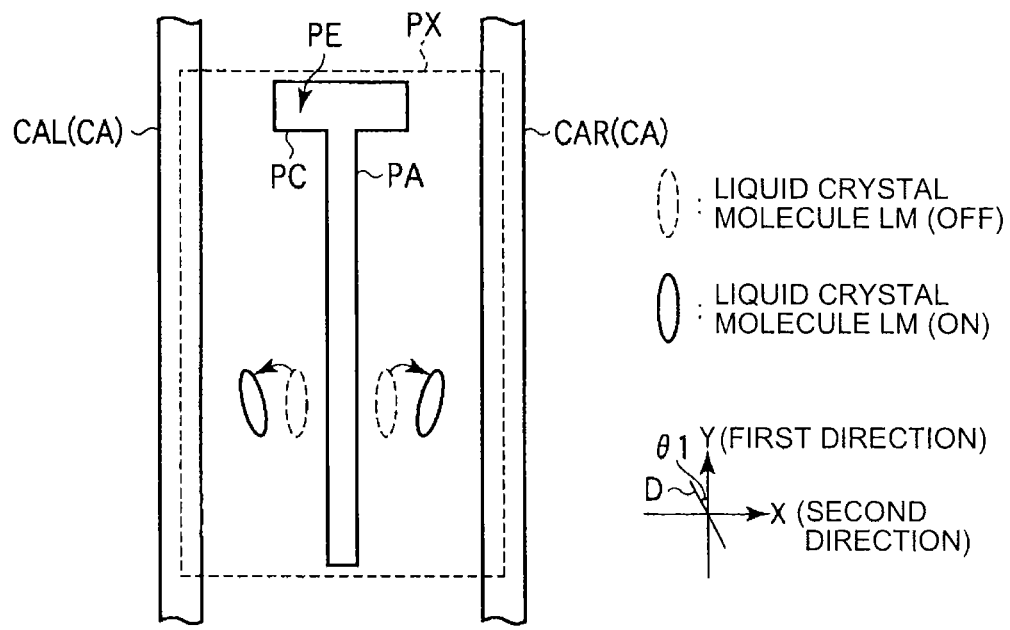
FIG. 3 is a plan view schematically showing a minimum unit constituent of one pixel.

FIG. 3 is a plan view schematically showing a minimum unit constituent of one pixel PX.

The pixel electrode PE has a main pixel electrode PA and a capacitance portion PC. The main pixel electrode PA and the capacitance portion PC are electrically connected each other. All the pixel electrodes PE are formed on the array substrate AR in this embodiment.

The main pixel electrode PA extends along the first direction Y. The capacitance portion PC extends along the second direction X different from the first direction Y. More specifically, the main pixel electrode PA is formed in the shape of a belt linearly extending along the first direction Y approximately in the central portion of the pixel. The capacitance portion PC is formed in the shape of a belt linearly extending along the second direction X in an upper end portion of the pixel PX. In addition, the capacitance portion PC may be arranged between up-and-down adjacent pixels PX. That is, the capacitance portion PC may be arranged striding over a boundary between the illustrated pixel PX and the adjacent pixel PX (not shown) of the upper portion.

The capacitance portion PC is connected with one end of the main pixel electrode PA and extends toward its both sides from the main pixel electrode PA. The capacitance portion PC is orthogonally crosses the main pixel electrode PA. In addition, the capacitance portion PC may be arranged on the other end portion side rather than one end portion of the main pixel electrode PA. The pixel electrode PE is electrically connected with the switching element (not shown) in this capacitance portion PC, for example.

The common electrode CE includes a plurality of main common electrodes CA. The main common electrodes CA are electrically connected each other. The common electrode CE is insulated electrically from the pixel electrode PE. In this embodiment, at least some portions of the main common electrode CA in the common electrode CE are formed on the counter substrate CT.

The main common electrode CA extends along the first direction Y. In the illustrated example, the main common electrode CA is formed in the shape of a belt linearly extending along the first direction Y. In addition, the main common electrode CA is arranged in two parallel lines. Hereinafter, in order to distinguish the two main common electrodes CA respectively, the main common electrode of the left-hand side in the figure is called CAL, and the main common electrode of the right-hand side in the figure is called CAR.

The main common electrode CAL and the main common electrode CAR are arranged between adjacent right-and-left pixels. That is, the main common electrode CAL is arranged striding over a boundary between the illustrated pixel PX and the pixel (not shown) of the left-hand side, and the main common electrode CAR is arranged striding over a boundary between the illustrated pixel PX and the pixel (not shown) of the right-hand side.

The pair of main common electrode CA is arranged so as to sandwich the main electrode PA. That is, the main common electrode CA and the main pixel electrode PA are arranged by turns along the second direction X. The main pixel electrode PA and the pair of main common electrode CA are arranged approximately in parallel each other. At this time, in a X-Y plane, none of the main common electrodes CA overlaps the main pixel electrode PA in the X-Y plane, but an aperture which contributes mainly to the display is formed between each of the main common electrode CA and the main pixel electrodes PA.

That is, one main pixel electrode PA is located between the adjoining main common electrode CAL and main common electrode CAR. In other word, the main common electrode CAL and the main common electrode CAR are arranged at the both sides which sandwich the main pixel electrode PA. For this reason, the main common electrode CAL, the main pixel electrode PA, and the main common electrode CAR are arranged along the second direction X in this order.

The distance between the main common electrode CAR and the main pixel electrode PA is substantially the same as that between the main common electrode CAL and the main pixel electrode PA in the second direction X. Apertures are formed between the main common electrode CAL and the main pixel electrode PA, and between the main pixel electrode PA and the main common electrode CAR, respectively. That is, in the example shown here, two apertures are formed in one PX.

In this embodiment, the initial alignment direction of the liquid crystal molecule LM is substantially in parallel with the first direction Y, however, may be an oblique direction D crossing the first direction Y. Here, the angle $\theta 1$ between the first direction Y and the initial alignment direction D is set to an angle larger than 0° and smaller than 45°. From a viewpoint of alignment control of the liquid crystal molecules, it is extremely effective that the angle $\theta 1$ is set to approximately 5° to 25°, and more preferably, around 10°. Here, the angle $\theta 1$ is a slightly oblique direction by about several degrees, for example, 7°, with respect to the first direction Y.

In addition, the pixel electrode PE may be further equipped with sub-pixel electrodes which extend along the second direction X. Moreover, the common electrode CE may be further equipped with sub-common electrodes which extend along the second direction X.

Figure 4:
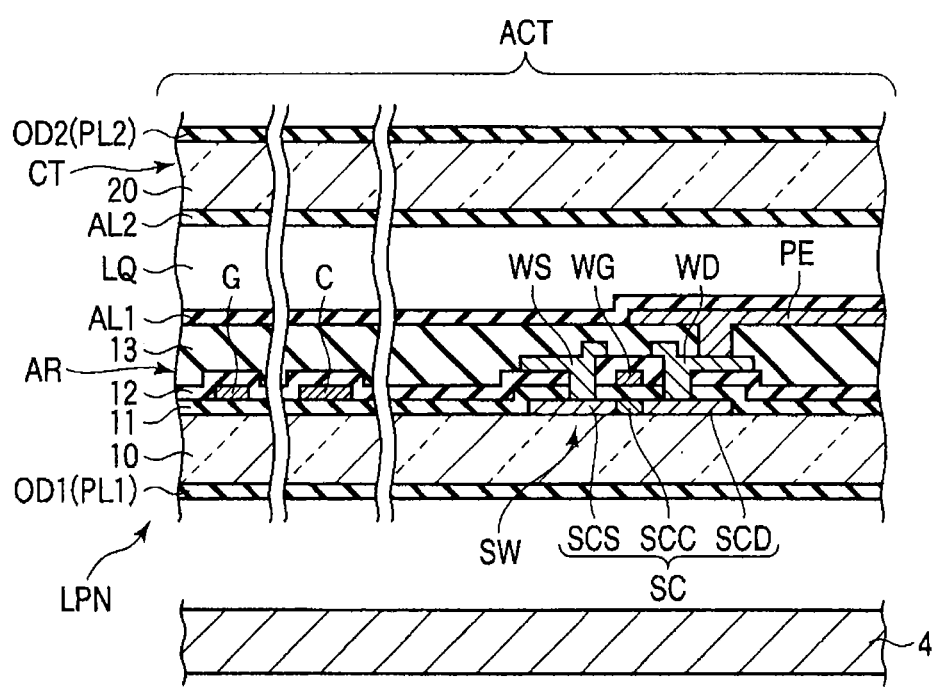
FIG. 4 is a cross-sectional view schematically showing the liquid crystal display panel including a switching element, etc.

FIG. 4 is a view schematically showing the cross-section of the liquid crystal display panel LPN including the switching element SW, the gate line G, and the auxiliary capacitance line C. In addition, illustration of the common electrode is omitted and only the portion required for explanation is illustrated here.

The backlight 4 is arranged at the back side of the array substrate AR which constitutes the liquid crystal display panel LPN.

The array substrate AR is formed using an insulating substrate 10 having a light transmissive characteristic, such as a glass substrate and a plastic substrate. This array substrate AR includes the switching element SW, the pixel electrode PE, the first alignment layer AL1, etc., on the first insulating substrate 10 on the side facing the counter substrate CT.

In the example shown here, the switching element SW may be either a top gate-type switching element or a bottom gate-type switching element, and includes a semiconductor layer formed of a poly-silicon or amorphous silicon, though the detailed description thereof is not made.

The semiconductor layer SC has a source region SCS and a drain region SCD on both sides which faces across a channel region SCC, respectively. In addition, an undercoat layer which is an insulating film may be arranged between the first insulating substrate 10 and the semiconductor layer SC. The semiconductor layer SC is covered with a gate insulating film 11. Moreover, the gate insulating film 11 is arranged also on the first insulating substrate 10.

The gate electrode WG is formed on the gate insulating film 11, and is located on the channel region SCC of the semiconductor layer SC. The gate line G and the auxiliary capacitance line C are also formed on the gate insulating film 11. The gate electrode WG, gate line G and the auxiliary capacitance line C may be formed using the same process and the same material. The gate electrode WG is electrically connected with the gate line G.

The gate electrode WG and the auxiliary capacitance line C are covered with a first interlayer insulating film 12. Moreover, the first interlayer insulating film 12 is arranged also on the gate insulating film 11. The gate insulating layer and 11 and the first interlayer insulating film 12 are formed of an inorganic system material, such as silicon oxide and a silicon nitride.

A source electrode WS and a drain electrode WD of the switching element SW are formed on the first interlayer insulating film 12. The source line (not shown) is also formed on the first interlayer insulating film 12. Moreover, in this figure, the source line S (not shown) formed on the first interlayer insulating film 12 is also illustrated. The source electrode WS, the drain electrode WD, and the source lines S1 and S2 may be formed using the same process and the same material. The source electrode WS is electrically connected with the source lines.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. The gate electrodes WG, the gate line G, the auxiliary capacitance line C, the source electrode WS, the drain electrode WD, and the source line are formed of electric conductive materials, such as molybdenum, aluminum, tungsten, and titanium, for example.

The switching element SW as described-above is covered with a second interlayer insulating film 13. That is, the source electrode WS, the drain electrode WD, and the source lines are covered with the second interlayer insulating film 13. Moreover, the second interlayer insulating film 13 is arranged also on the first interlayer insulating film 12. This second interlayer insulating film 13 is formed of various organic materials, such as ultraviolet curing type resin and heat curing type resin, for example.

The pixel electrode PE is formed on the second interlayer insulating film 13. Though not described in detail, the main pixel electrode PA and the capacitance portion PC forming the pixel electrode PE are formed on the second interlayer insulating film 13. The pixel electrode PE is connected with the drain electrode WD through a contact hole which penetrates the second interlayer insulating film 13. Though pixel electrode PE is formed by light transmissive conductive materials, such as Indium Tin Oxide (ITO), Indium Zinc Oxide (IZO), etc, other metals such as aluminum may be used.

In addition, the array substrate AR is further equipped with a first main common electrode as a portion of the common electrode to be mentioned later.

A first alignment film AL1 is arranged on a surface of the array substrate AR facing the counter substrate CT, and extends approximately whole region of the active area ACT. The first alignment film AL1 covers the pixel electrode PE and the first main common electrode (not shown), and also formed on the second interlayer insulating film 13. The first alignment film AL1 is formed of the material which shows a lateral alignment characteristics.

On the other hand, the counter substrate CT is formed using a second transmissive insulating substrate 20, such as a glass substrate and a plastic substrate. The counter substrate CT includes a second main common electrode of the common electrode (not shown) and a second alignment film AL2 on the surface of the second insulating substrate 20 facing the array substrate AR. A black matrix arranged facing wiring portions such as the source line S, the gate line G, the auxiliary capacitance line C, and the switching element SW to define the respective pixels PX, color filter layers arranged corresponding to the pixels PX, and an overcoat layer to smooth the concave and depression of the surface of the black matrix and the color filter layer may be formed on the counter substrate CT.

The common electrode is formed of the electric conductive material which has light transmissive characteristics, such as ITO and IZO, for example.

The second alignment films AL2 is arranged on the surface of the counter substrate CT opposing the surface of the array substrate AR, and extends approximately whole of the active area ACT. The second alignment films AL2 covers the second main common electrode of the common electrode (not shown) and the like. The second alignment films AL2 is formed materials which has a lateral alignment characteristics In the first and second alignment films AL1 and AL2, alignment treatment processing (for example, rubbing processing and photo alignment processing) is performed for making the liquid crystal display molecule in an initial alignment state. The first alignment treatment direction in which the first alignment film AL1 makes the liquid crystal molecule in the initial alignment direction, the second alignment treatment direction in which the second alignment film AL2 makes the liquid crystal molecule in the initial alignment direction, are respectively directions in parallel to the first direction Y or an slightly oblique direction D crossing the first direction Y. The first and second alignment treatment directions are in parallel each other, and in the same or reverse direction.

The array substrate AR and the counter substrate CT as mentioned-above are arranged so that the first alignment film AL1 and the second alignment film AL2 face each other. In this case, the pillar-shaped spacer is formed integrally with one of the substrates by resin material between the first alignment film AL1 on the array substrate AR and the second alignment film AL2 on the counter substrate CT. Thereby, a predetermined gap, for example, a 3-7 μm cell gap, is formed, for example. The array substrate AR and the counter substrate CT are pasted together by seal material which is not illustrated, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted by positive type liquid crystal material.

A first optical element OD1 is attached to the external surface of the array substrate AR, i.e., the external surface of the first insulating substrate 10 which constitutes the array substrate AR by adhesives, etc. The first optical element OD1 contains first polarizing plate PL1 which has a first polarization axis. Moreover, a second optical element OD2 is attached to the external surface of the counter substrate CT, i.e., the external surface of the second insulating substrate 20 which constitutes the counter substrate CT by adhesives, etc. The second optical element OD2 contains a second polarizing plate PL2 which has a second polarization axis. The first polarization axis of the first polarizing plate PL1 and the second polarization axis of the second polarizing plate PL2 are in the spatial relationship in which both of the first and second polarizing plate PL1 and PL2 intersect perpendicularly, for example. One polarizing plate is arranged, for example, so that its polarizing direction is the direction of the long axis of the liquid crystal molecule, i.e., the first alignment treatment direction or a parallel direction to the second alignment treatment direction (or in parallel to the first direction Y), or in an orthogonal direction (or in parallel to the second direction X). Thereby, the normally black mode is achieved.

Namely, at the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment direction of the first alignment film AM and the second alignment direction of the second alignment film AL2 as shown with a dashed line in FIG. 3. In this state, at the time of OFF, the alignment state corresponds to the initial alignment state, and the alignment direction of the liquid crystal molecule LM corresponds to the initial alignment direction.

In addition, precisely, the liquid crystal molecules LM are not exclusively aligned in parallel with a X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with a X-Y plane, and is explained as what rotates in a field in parallel with the X-Y plane.

Here, both of the first alignment treatment direction of the first alignment film AL1 and the second alignment treatment direction of the second alignment film AL2 are directions in parallel to the first direction Y or directions in parallel to the oblique direction D. At the time of OFF, the long axis of the liquid crystal molecule LM is aligned substantially in parallel to the first direction Y or the oblique direction D. That is, the direction for initial alignment of the liquid crystal molecule LM is in parallel to the first direction Y or the oblique direction D. In the example shown in FIG. 3, the initial alignment direction of the liquid crystal molecule LM is in parallel to the first direction Y.

In addition, when both of the first and second alignment treatment directions are in parallel, and are reverse directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment). In addition, when the respective directions of the alignment treatment of the first alignment film AM and the second alignment film AL2 are in parallel and the same each other, the liquid crystal molecule LM is aligned with approximately horizontal direction (i.e., the pre tilt angle is approximately zero) in a cross-section of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate area of the liquid crystal layer LQ (splay alignment).

Some of the back light from the backlight 4 enters into the liquid crystal display panel LPN after penetrating the first polarizing plate PL1. The polarization state of the light which enters into the liquid crystal display panel LPN changes depending on the alignment state of the liquid crystal molecule LM when the light passes the liquid crystal layer LQ. At the time of OFF, the light which passes the liquid crystal layer LQ is absorbed by the second polarizing plate PL2 (black display).

On the other hand, in case where the potential difference is formed between the pixel electrode PE and the common electrode CE (at the time of ON), the lateral electric field in parallel to the substrate (or oblique electric field) is formed between the pixel electrode PE and the common electrode CE Thereby, the liquid crystal molecule LM rotates within a parallel plane with the substrate surface so that the long axis becomes in parallel with the direction of the electric field as shown in a dashed line in FIG. 3.

In the example shown in FIG. 3 the liquid crystal molecule LM between the main pixel electrode PA and main common electrode CAL rotates counterclockwise along with the lateral electric field between the main electrode PA and the main common electrode CAL, and is aligned so that the liquid crystal molecule LM may turn to the upper left direction in the figure. The liquid crystal molecule LM between the main electrode PA and the common main electrode CAR rotates clockwise along with the lateral electric field between the main electrode PA and the common main electrode CAR, and is aligned so that the liquid crystal molecule LM may turn to the upper right direction in the figure.

Thus, in each pixel PX, where horizontal electric field is formed between the pixel electrode PE and the common electrode CE, the alignment direction of the liquid crystal molecule LM is divided into at least two groups of directions, and two domains are formed corresponding respective alignment directions. That is, at least two domains are formed in each pixel PX.

At the time of ON, the light which entered into the liquid crystal panel LPN from the backlight 4 enters into the liquid crystal layer LQ. When the back light which entered into the liquid crystal layer LQ passes through two domains (apertures) divided with the pixel electrode PE and the common electrode CE, respectively, the polarization state changes. At the time of ON, at least a portion of light which passed the liquid crystal layer LQ penetrates the second polarizing plate PL2 (white display).

According to this embodiment, it becomes possible to form at least two domains. Therefore, the viewing angle in at least two directions can be compensated optically, and a wide viewing angle is attained while becoming possible to suppress the generation of gradation reversal. Accordingly, it becomes possible to offer a high quality display device.

Moreover, the transmissivity of each domain becomes equal by setting up the area of at least two apertures divided with the pixel electrode PE and the common electrode CE substantially equal in one pixel. Therefore, it becomes possible to achieve a uniform display with wide viewing angle by compensating the light passing the respective apertures optically each other.

Furthermore, at the time of ON, since the horizontal electric field is hardly formed (or sufficient electric field to drive the liquid crystal molecule LM is not formed) near the main pixel electrode PA of the pixel electrode PE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, back light hardly penetrates, i.e., hardly contributes to the display at the time of ON. Therefore, the pixel electrode PE and the common electrode CE do not necessarily need to be formed of a transparent electric conductive material, and may be formed using electric conductive materials, such as aluminum and silver.

Moreover, when an alignment shift occurs between the array substrate AR and the counter substrate CT, a difference may arises in distance between the respective common electrodes CE of the both sides and the pixel electrode PE. However, since the alignment shift is produced in common to all the pixels PX, there is no difference in the electric field distribution between the pixels PX, and the influence to the display of the image is negligible.

Figure 5:
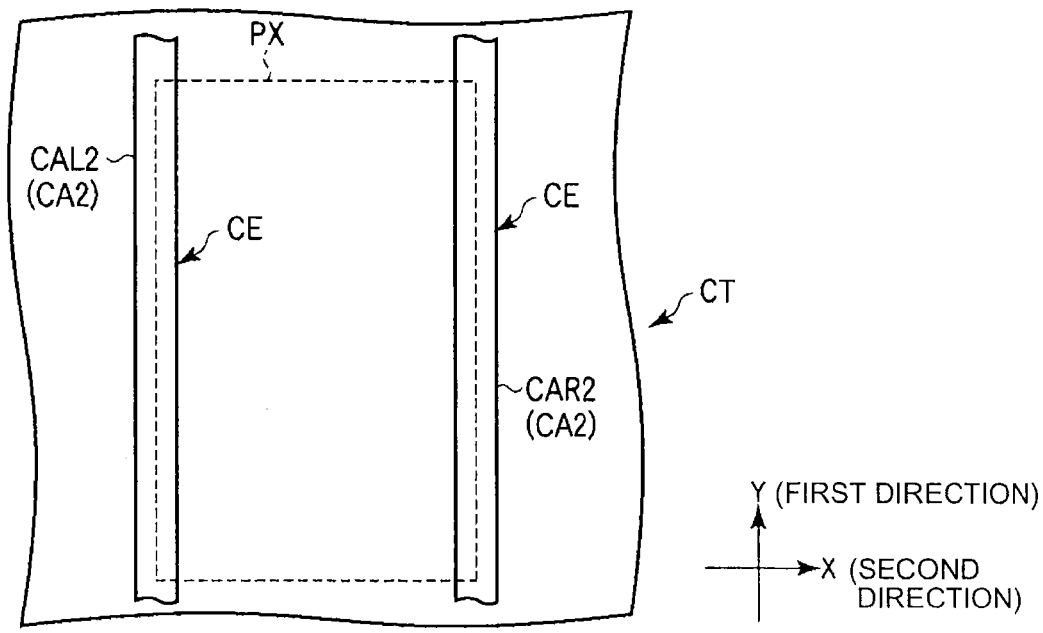
FIG. 5 is a plan view schematically showing a structure of one pixel in a counter substrate according to this embodiment.

Next, one example of the structure according to this embodiment is explained. FIG. 5 is a plan view schematically showing the structure of one pixel in the counter substrate CT of the liquid crystal panel LPN.

In the example of the structure explained here, the common electrode CE has a first main common electrode in the array substrate which is not illustrated, and second main common electrode CA2 formed in the counter substrate CT.

The illustrated counter substrate CT includes a second main common electrode CA2 in a belt shape extending linearly along the first direction Y. A plurality of second main common electrodes CA2 is electrically connected each other. In the illustrated example, the common electrode CE is formed in the shape of a stripe in the counter substrate CT.

In addition, the second main common electrodes CA2 illustrated are formed in two parallel lines along the second direction X. Hereinafter, in order to distinguish these common electrodes, the second main common electrode of the left-hand side in a figure is called CAL2, and the second main common electrode of the right-hand side in a figure is called CAR2. Although such second main common electrode CA2 of the common electrode CE is not explained in detail, the second main common electrode CA2 is pulled out to the outside of the active area, and is electrically connected with the electric supply portion formed in the array substrate through an electric conductive component, and electric common potential is supplied.

Next, the array substrate AR which is suitably combined with the counter substrate CT shown in FIG. 5 is explained.

Figure 6:
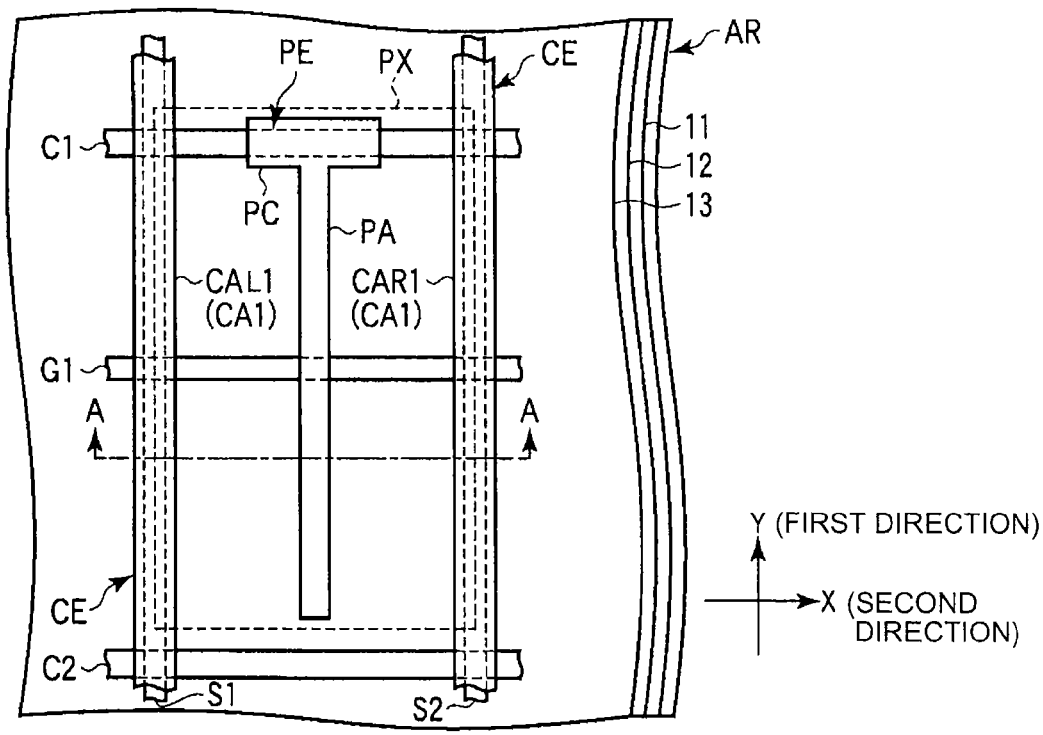
FIG. 6 is a plan view schematically showing a structure of an array substrate of the pixel in the liquid crystal display panel when the pixel is seen from the counter substrate side according to this embodiment.

FIG. 6 is a plan view schematically showing the structure of the array substrate AR when one pixel PX of the liquid crystal panel LPN in the example of one structure according to this embodiment is seen from the counter substrate CT side. In addition, only structure required for the explanation in one PX is illustrated, and illustration of the switching element, etc., is omitted.

The array substrate AR includes an auxiliary capacitance line C1 and an auxiliary capacitance line C2 extending along the second direction X, a gate line G1 extending along the second direction X, a source line S1 and the source line S2 extending along the first direction Y, a pixel electrode PE, and a belt-like first main common electrode CA1 extending linearly along the first direction Y as the common electrodes CE. The auxiliary capacitance line C1, the auxiliary capacitance line C2, and the gate line G1 are formed on the gate insulating film 11, and are covered with the first interlayer insulating film 12. The source line S1 and the source line S2 are formed on the first interlayer insulating film 12, and are covered with the second interlayer insulating film 13. The pixel electrode PE is formed on the second interlayer insulating film 13. The first main common electrode CA1 is formed on the second interlayer insulating film 13, for example, like the pixel electrode PE.

In the illustrated example, the pixel PX corresponds to a region shown in dashed line in the figure, and has the shape of a rectangle in which the length in the first direction Y is longer than that in the second direction X. Moreover, in the illustrated example, the source line S1 is arranged at the left-hand side end in the pixel PX. Precisely, the source line S1 is arranged striding over the boundary between the illustrated pixel and the pixel which adjoins the illustrated pixel PX at its left-hand side end. The source line S2 is arranged at the right-hand side end. Precisely, the source line S1 is also arranged striding over the boundary between the illustrated and the pixel which adjoins the illustrated pixel PX at its right-hand side end. The auxiliary capacitance line C1 is arranged at the upper portion end. In addition, the gate line G1 is arranged approximately in the central portion of the pixel PX. The auxiliary capacitance line C1 may be arranged striding over the boundary between the illustrated pixel PX and the adjacent pixel PX of the upper side. Similarly, the auxiliary capacitance line C2 may be arranged striding over the boundary between the illustrated pixel PX and the adjacent pixel of the bottom side.

In the common electrode CE, the first main common electrode CA1 illustrated is formed in parallel two lines along the second direction X. Hereinafter, in order to distinguish the main common electrodes, the first main common electrode of the left-hand side in the figure is called CALL and the first main common electrode of the right-hand side in the figure is called CAR1. When the first main common electrode CA1 is formed on the second interlayer insulating film 13 with the pixel electrode PE, the first main common electrode CA1 can be formed using the same process and the same materials (for example, ITO, etc.) as the pixel electrode PE.

In addition, other interlayer insulating films may be arranged between the first main common electrode CA1 and the pixel electrode PE, and the first main common electrode CA1 may be formed of a different layer from the pixel electrode PE. In this case, the first main common electrode CA1 may be formed of material which is different from the pixel electrode PE, or may be formed of the same material as the pixel electrode PE.

In the illustrated example, the first main common electrode CAL1 is arranged at the left-hand side end of the pixel PX, and faces the source line S1. Moreover, the first main common electrode CAR1 is arranged at the right-hand side end of the pixel PX, and faces the source line S2.

The first main common electrodes CAL1 linearly extending in each active area are pulled out to the outside of the active area, and are electrically connected with the electric supply portion formed on the array substrate AR, respectively. Thereby, electric power of common potential is supplied to the first main common electrode CA1. That is, the first main common electrode CA1 and the second main common electrode CA2 are electrically connected each other.

In case, the first main common electrodes CAM and CAL2 respectively cover the source line S1 and the source line S2 in the active area, the width of the respective first main common electrodes CAL1 and CAL2 along the second direction X is substantially equal to or more than those of the source line S1 and the source line S2.

The pixel electrode PE is arranged between the source line S1 and the source line S2 (i.e., between the first main common electrode CAL1 and first main common electrode CAR1). The pixel electrode PE has the belt-like main pixel electrode PA linearly extending along the first direction Y and the belt-like capacitance portion PC linearly extending along the second direction X. In the illustrated example, the main pixel electrode PA and the capacitance portion PC are formed integrally and continuously.

The main pixel electrode PA is arranged in an inside position of the pixel PX rather than the position on the adjoining source line S1 and the source line S2, and is arranged between the source line S1 and the source line S2. More specifically, the main pixel electrode PA is arranged in the approximately center position between the source line S1 and the source line S2. In other words, the main pixel electrode PA is arranged in the approximately center position between the first main common electrode CAL1 and the first main common electrode CAR1. The main pixel electrode PA extends from a vicinity of the upper portion end to a vicinity of the bottom end portion of the pixel PX.

The capacitance portion PC is arranged at the upper portion end of the pixel PX, and is connected with one end portion of the main pixel electrode PA. The capacitance portion PC linearly extends toward both-sides of the main pixel electrode PA, i.e., the source line S1 and the source line S2, or the first main common electrode CAL1 and the first main common electrode CAM, respectively.

The capacitance portion PC faces the auxiliary capacitance line C1. In the illustrated example, the capacitance portion PC is arranged on the auxiliary capacitance line C1. Between the capacitance portion PC and the auxiliary capacitance line C1, a first interlayer insulating film 12 and a second interlayer insulating film 13 are interposed as insulating films. However, when the pixel electrode PE is formed on the second interlayer insulating film 13 with the first main common electrode CA1, the capacitance portion PC is arranged so that the capacitance portion PC does not contact with the first main common electrode CAL1 and the first main common electrode CAR1 or are apart from the first main common electrode CAL1 and the first main common electrode CAR1. When the pixel electrode PE is formed on a different layer from the first main common electrode CA1 through an interlayer insulating film which is not illustrated, the capacitance portion PC may be arranged so that the capacitance portion PC intersects the first main common electrode CAL1 and the first main common electrode CAR1 through the interlayer insulating film which is not illustrated.

In addition, the gate line G1 may be arranged at the upper end portion of the pixel PX, and the auxiliary capacitance line C1 may be arranged in the central portion of the pixel PX. In this case, the capacitance portion PC is arranged in the central portion of the pixel PX, and counters with the auxiliary capacitance line C1.

Figure 7:
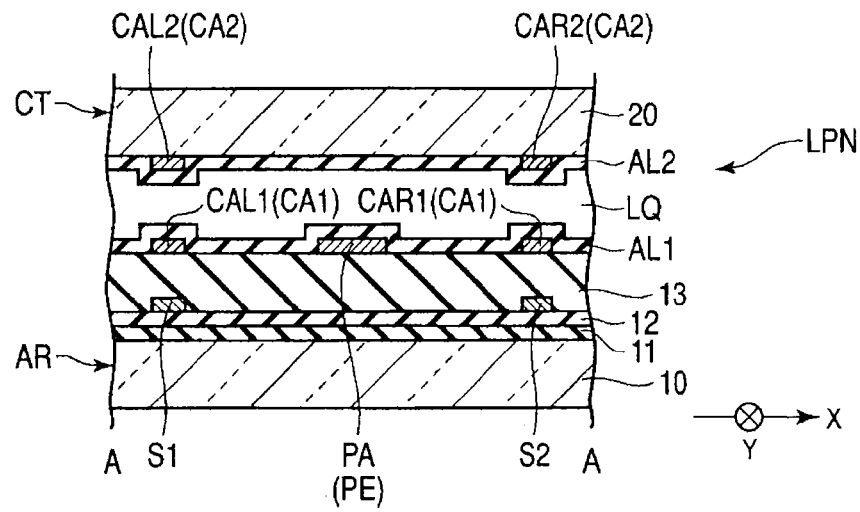
FIG. 7 is a cross-sectional view schematically showing the structure of the pixel taken along line A-A shown in FIG. 6.

FIG. 7 is a cross-sectional view of the pixel of the liquid crystal display panel LPN schematically showing a structure taken along line A-A in FIG. 6. In this embodiment, a case is shown in which the first main common electrode CAL1 and the first main common electrode CAR1 are arranged on the second interlayer insulating film 13 with the pixel electrode PE, and only the structure required for explanation is illustrated here.

The first main common electrode CAL1 and the first main common electrode CAR1 are arranged at the both sides which sandwiches the main pixel electrode PA. In other word, the main pixel electrode PA is arranged between the first main common electrode CAL1 and the first main common electrode CAR1. The first main common electrode CAL1 counters with the source line S1. The first main common electrode CAR1 counters with the source line S2. Between the first main common electrode CAL1 and the source line S1 and between the first main common electrode CAR1 and the source line S2, the second interlayer insulating film 13 is interposed in the illustrated example, respectively. The pixel electrode PE, the first main common electrode CAL1 and the first main common electrode CAR1 are covered with the first alignment film AL1.

The second main common electrode CAL2 and the second main common electrode CAR2 are arranged at the both sides sandwiching the position right above the main pixel electrode PA. In other word, the main pixel electrode PA is arranged between the second main common electrode CAL2 and the second main common electrode CAR2. The second main common electrode CAL2 faces the first main common electrode CALL The second main common electrode CAR2 faces the first main common electrode CAR1. The second main common electrode CAL2 and the second main common electrode CAR2 are electrically connected with the first main common electrode CAL1 and the first main common electrode CAR1. The second main common electrode CAL2 and the second main common electrode CAR2 are covered with the second alignment film AL2.

As above-mentioned, the first main common electrode CA1 and the second main common electrode CA2 overlap through the liquid crystal layer LQ each other, and the first main common electrode CA1 and the source line S overlap through the insulating film each other. That is, the first main common electrode CA1, the second main common electrode CA2, and the source line S are arranged on the same line.

The distance in the second direction X between the main pixel electrode PA and the source line S1, the first main common electrode CAL1 or the second main common electrode CAL2, is approximately the same as that between the main pixel electrode PA and the source line S2, the first main common electrode CAR1 or the second main common electrode CAR2.

In the above structure, when displaying black image on the pixel PX, potential difference, i.e., electric field is not formed between the pixel electrode PE including the main pixel electrode PA and the first main common electrode CA1 and the second main common electrode CA2. On the other hand, when displaying white image on the pixel PX, electric field is formed by the potential difference between the pixel electrode PE including the main pixel electrode PA and the first main common electrode CA1 and the second main common electrode CA2.

As illustrated, since the first main common electrode CA1 counters with the source line, even if any one of the black image and the white image is displayed on the pixel PX, it becomes possible to shield undesirable electric field from the source line by the first main common electrode CA1. The shield performance against electric field from the source line is improved with the increase of the width of the first main common electrode CA1. However, since the aperture which mainly contributes to the display is formed between the first main common electrode CA1 and the main pixel electrode PA, if the width of the first main common electrode CA1 is too wide, the area of the aperture becomes small and reduction of transmissivity is caused.

Therefore, it becomes possible to raise the electric field shield performance by the electric field from the source lines while maintaining high transmissivity in the case where the first main common electrode CAL1 and the first main common electrode CAR1 are respectively arranged on the source line S1 and the source line S2, and have substantially the same width as the source line S1 and the source line S2, respectively.

According to this embodiment, it is possible to suppress the application of undesirable bias from the source line to the liquid crystal layer LQ by shielding undesirable electric field from the source line. Thereby the generation of cross talk is controlled. In other word, when the pixel potential which displays white is supplied to the source line connected to the pixel PX, the phenomenon of rising up of luminosity resulted from the generation of the disorder of the alignment of the liquid crystal molecule is suppressed in the state where the pixel PX is set to a potential to display the black image. Thereby, it becomes possible to control the generating of a poor display. Accordingly, a higher quality liquid crystal display device can be offered.

According to this embodiment, the second main common electrode CRL2 and the second main common electrode CAR2 face the first main common electrode CAL1 and the first main common electrode CAR1, respectively. When the first main common electrode CA1 and the second main common electrode CA2 are especially arranged right above source lines, respectively, the aperture is made large as compared with the case where the first main common electrode CA1 and the second main common electrode CA2 are arranged on the main pixel electrode PA side rather than right above respective source lines, and it becomes possible to raise the transmissivity of the pixel PX.

Moreover, it becomes possible to expand the distance between the main pixel electrode PA and the second main common electrode CA2 or between the main pixel electrode PA and the second main common electrode CA1 by arranging each of the first main common electrodes CA1 right above the source line, and arranging each of the second main common electrodes CA2 right above the first main common electrode CA1, and becomes possible to form more horizontal electric field closer to the horizontal direction. For this reason, it also becomes possible to maintain the wide viewing angle which is an advantage of the common IPS mode.

Moreover, it becomes possible to suppress the generation of undesired vertical electric field, i.e., an electric field along the normal line with respect to the substrate surface in a region where the first main common electrode CA1 and the second main common electrode CA2 face each other sandwiching the liquid crystal layer.

Figures 8A, 8B:
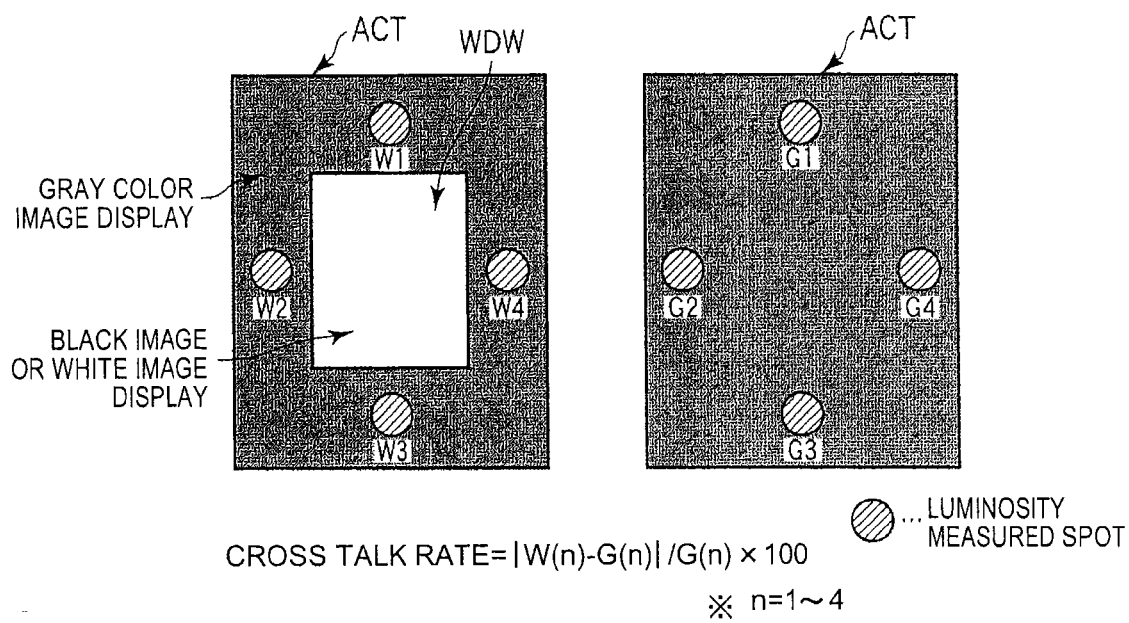
FIG. 8A and FIG. 8B are figures showing definition of a cross-talk rate introduced in this embodiment.

Next, the effect of this embodiment is verified. FIG. 8A and FIG. 8B are figures for explaining the definition of a cross talk rate introduced in this embodiment.

As a first example, the luminosity was measured using a pattern in which a window WDW is formed in approximately center portion of the active area ACT as shown in FIG. 8A. The luminosities of four spots located in four directions adjacent to the window WDW are measured. Here, while black image and white image are displayed in the window WDW, the peripheral region displays the gray color image. The respective luminosities of four spots shown in the figure are denoted by W1, W2, W3, and W4. Next, as shown in FIG. 8B, the luminosities of the same four spots as those shown in FIG. 8A were measured when same gray color image was displayed in the whole active area. The respective luminosities of the four spots are denoted as G1, G2, G3, and G4. In this case, the cross talk rate is defined as follows.

Cross talk rate=$|W(n)-G(n)|/G(n) \times 100$(here, $n$=1-4)

First, the cross talk rate was measured about the same structure as that of this embodiment except that the first main common electrode facing the source line is not formed as a comparative example. Next, the structure in which 60% of the source line width is covered with the first main common electrode, i.e., the covered rate of source line is 60% is used as a first example according to this embodiment. Further, the structure in which 100% of the source line width is covered with the first main common electrode, i.e., the covered rate of source line is 100% is used as a second example according to this embodiment.

When the cross talk rate of the comparative example is standardized as 1, the cross-talk rate of the first example was 0.84, and the cross talk rate of the second embodiment was 0.49. Thus, in the case of the first example and the second example according to this embodiment, it was verified that it is possible to reduce the generation of the cross-talk.

As explained above, according to this embodiment, it becomes possible to offer a high quality liquid crystal display device.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device having a plurality of pixels, comprising:
   a first substrate including;
      a first source line and a second source line extending in a first direction,
      a main pixel electrode arranged between the first source line and the second source line and extending in the first direction,
      a pair of main common electrodes arranged on the first source line and the second source line interposing an insulating layer therebetween and extending in the first direction, respectively, a gate line formed extending in a second direction orthogonally crossing the first direction and crossing the pixel, a pair of capacitance lines formed at an upper side end portion and a lower side end portion of the pixel extending in the second direction, and a capacitance portion located at one end of the main pixel electrode and facing one of the capacitance lines, a second substrate facing the first substrate; and a liquid crystal layer containing liquid crystal molecules and held between the first substrate and the second substrate, wherein no electrodes are arranged on the second substrate above the main pixel electrode formed in the first substrate, the gate line is arranged between the pair of capacitance lines approximately in the center of pixel, and an alignment state of the liquid crystal molecules is a splay alignment state, and the initial alignment direction of the liquid crystal molecules is a direction in parallel to the first direction or an oblique direction crossing the first direction in a state that an electric field is not formed between the main pixel electrode and the main common electrode.

2. The liquid crystal display device according to claim 1, wherein the first source line, and the main common electrodes are aligned on a same normal line with respect to the surface of the first and second substrates.

3. The liquid crystal display device according to claim 1, wherein the main pixel electrode is formed on the insulating layer and formed of the same material as those of the pair of the main common electrodes.

4. The liquid crystal display device according to claim 1, further comprising a first alignment film covering the main pixel electrode and the main common electrode formed on the first substrate, and a second alignment film formed on the second substrate, wherein a first alignment treatment direction of the first alignment film to align initially the liquid crystal molecules and a second alignment treatment direction of the second alignment film to align initially the liquid crystal molecules are directions in parallel to the first direction or an oblique direction crossing the first direction.

5. A liquid crystal display device having a plurality of pixels, comprising:

a first substrate including;

a first source line and a second source line extending in a first direction, a main pixel electrode arranged between the first source line and the second source line and extending in the first direction, a pair of main common electrodes arranged on the first source line and the second source line interposing an insulating layer therebetween and extending in the first direction, respectively, a gate line formed extending in a second direction orthogonally crossing the first direction and crossing the pixel, a pair of capacitance lines formed at an upper side end portion and a lower side end portion of the pixel extending in the second direction, and a capacitance portion located at one end of the main pixel electrode and facing one of the capacitance lines, a second substrate facing the first substrate; and a liquid crystal layer containing liquid crystal molecules and held between the first substrate and the second substrate;

wherein no electrodes are arranged on the second substrate above the main pixel electrode formed in the first substrate, the distance between the first source line and the main pixel electrode in the second direction is approximately the same as that between the main pixel electrode and the second source line, the gate line is arranged between the pair of capacitance lines approximately in the center of the pixel, an alignment state of the liquid crystal molecules is a splay alignment state, and the initial alignment direction of the liquid crystal molecules is a direction in parallel to the first direction or an oblique direction crossing the first direction in a state where an electric field is not formed between the main pixel electrode and the main common electrode, and the liquid crystal display device further comprising a first alignment film covering the main pixel electrode and the main common electrode formed on the first substrate, and a second alignment film formed on the second substrate, wherein a first alignment treatment direction of the first alignment film to align initially the liquid crystal molecules and a second alignment treatment direction of the second alignment film to align initially the liquid crystal molecules are directions in parallel to the first direction or an oblique direction crossing the first direction.

6. The liquid crystal display device according to claim 5, wherein the first and second source lines, and the main common electrodes are aligned on a same normal line with respect to the surface of the first and second substrates.

* * * * *